United States Patent
Okada (10) Patent No.: US 11,537,338 B1
(45) Date of Patent: Dec. 27, 2022

(54) SYSTEMS AND METHODS FOR MANAGING SETTINGS OF A PLURALITY OF IMAGE PROCESSING DEVICES

(71) Applicant: TOSHIBA TEC KABUSHIKI KAISHA, Tokyo (JP)

(72) Inventor: Yuuki Okada, Tagata Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/475,961

(22) Filed: Sep. 15, 2021

(51) Int. Cl.
*G06F 3/12* (2006.01)

(52) U.S. Cl.
CPC .......... *G06F 3/1226* (2013.01); *G06F 3/1204* (2013.01); *G06F 3/1232* (2013.01)

(58) Field of Classification Search
None
See application file for complete search history.

(56) References Cited

U.S. PATENT DOCUMENTS

| | | | | |
|---|---|---|---|---|
| 10,896,009 | B1* | 1/2021 | Sun | G06F 3/1222 |
| 11,126,386 | B2* | 9/2021 | Matsumura | G06F 3/1204 |
| 2003/0182367 | A1* | 9/2003 | Ohara | G06F 3/1288 |
| | | | | 709/203 |
| 2013/0159991 | A1 | 6/2013 | Sato | |
| 2013/0194630 | A1* | 8/2013 | Kishimoto | G06F 3/1296 |
| | | | | 358/1.15 |
| 2013/0321834 | A1* | 12/2013 | Suzuki | G06F 3/1285 |
| | | | | 358/1.13 |
| 2017/0041488 | A1* | 2/2017 | Shibata | H04N 1/00347 |
| 2018/0357135 | A1* | 12/2018 | Yoshida | G06F 11/2038 |

FOREIGN PATENT DOCUMENTS

| JP | 2018-063587 A | 4/2018 |
|---|---|---|
| JP | 2019-087877 A | 6/2019 |

\* cited by examiner

*Primary Examiner* — Miya J Williams
*Assistant Examiner* — Miya J Cato
(74) *Attorney, Agent, or Firm* — Foley & Lardner LLP (57) ABSTRACT

A processing device includes an interface, a memory, and a processor. The interface facilitates communication with a server and other processing devices. The memory stores first model information indicating a first model of the processing device. The processor receives setting information from the server where the setting information includes a first ID for identifying a first setting content, applies the first setting content, transmits first ID information including the first model information and the first ID to the other processing devices, receives second ID information from the other processing devices, acquires second model information from the second ID information, determines whether a second setting content of a second ID included in the second ID information is already applied to the processing device in response to the second model information matching the first model information, and transmits a notification to the server indicating that the second setting content is not applied.

19 Claims, 6 Drawing Sheets

```
----1.3.6.1.4.1.1129.2.3.50.1.9.10.100
    MODEL INFORMATION┘ └ID
```

FIG. 6

| DATE AND TIME | ID |
|---|---|
| 2021/3/1-12:00:00 | 100 |
| 2021/3/2-12:00:00 | 200 |

FIG. 7

| DATE AND TIME | ID | COUNT |
|---|---|---|
| 2021/3/1-10:00:00 | 101 | 1 |
| 2021/3/2-11:00:00 | 201 | 2 |

SYSTEMS AND METHODS FOR MANAGING SETTINGS OF A PLURALITY OF IMAGE PROCESSING DEVICES

FIELD

Embodiments described herein relate generally to an information processing device, an image processing device, and an information processing method.

BACKGROUND

A system is provided that manages a plurality of image processing devices. Such systems may use a server to configure the same settings for the plurality of image processing devices.

In the related art, the system may not be able to correctly specify the plurality of image processing devices for which the same settings are desired due to operator mistakes.

DETAILED DESCRIPTION

In order to solve the problem described above, it is possible to provide an information processing device, an image processing device, and an information processing method which can effectively set a plurality of image processing devices.

In general, according to one embodiment, an information processing device includes an interface, a memory, and a processor. The interface transmits and receives data to and from a server and other information processing devices. The memory stores model information indicating its own model. The processor receives setting information including an ID for identifying a setting content from the server through the interface, applies the setting content to itself, transmits ID information including the model information and the ID to the other information processing device through the interface, and receives the ID information from the other information processing device through the interface. Then, if model information included in the received ID information and model information stored in the memory match, the processor determines whether a setting content of an ID included in the received ID information is applied to itself. Next, if the processor determines that the setting content is not applied to itself, the processor transmits a notification indicating that the setting content is not applied to the server through the interface.

Hereinafter, an embodiment will be described with reference to the drawings. A management system according to the embodiment manages a plurality of image processing devices (for example, Multifunction printers (MFPs)) installed in an office or the like. The management system transmits setting information indicating a setting content of the image processing device from the server to the image processing device. The image processing device applies the setting content indicated by the setting information to itself.

Figure 1:
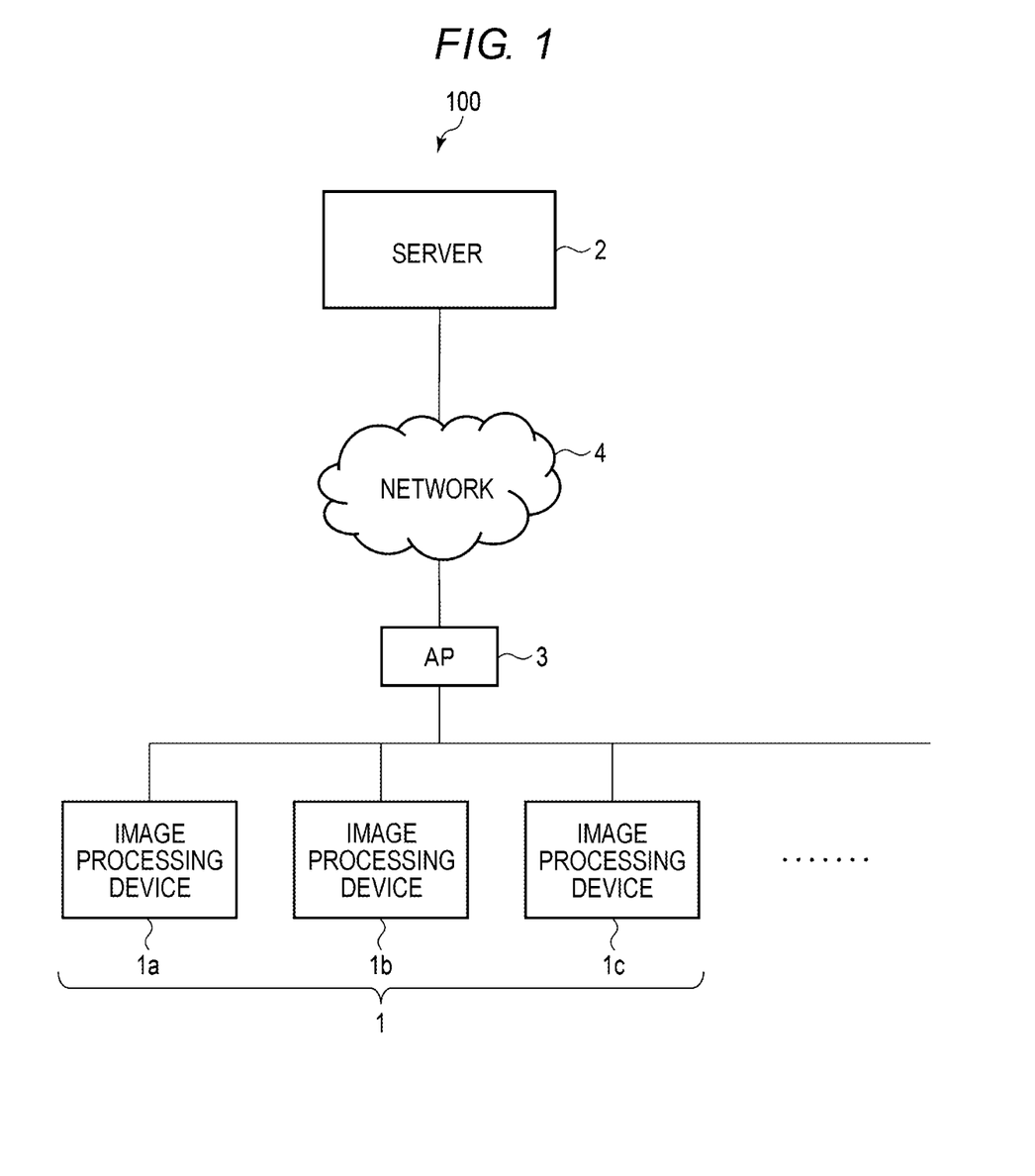
FIG. 1 is a block diagram illustrating a configuration example of a management system according to an embodiment.

FIG. 1 illustrates a configuration example of a management system 100 according to the embodiment. The management system 100 includes one or more image processing devices 1 (MFPs), a server 2, an access point 3, and the like. The server 2 and the access point 3 are connected to each other via a network 4. Further, the access point 3 is connected to the image processing device(s) 1.

The management system 100 may have a configuration as required in addition to the configuration illustrated in FIG. 1, or a specific configuration may be excluded from the management system 100.

The image processing device 1 performs processing related to an image such as copying, printing, or scanning. For example, the image processing device 1 uses toner to form an image on a medium such as a paper sheet. The image processing device 1 forms a toner image on a transfer body such as a transfer belt. The image processing device 1 transfers the toner image formed on the transfer body to a medium such as a paper sheet. The image processing device 1 fixes the toner on the medium by heating the medium on which the toner image is transferred. For example, the image processing device 1 is a MFP.

The management system 100 may include a plurality of image processing devices 1 (1a, 1b, 1c, etc.). For example, the plurality of image processing devices 1 are installed in a predetermined building such as an office.

The number of image processing devices 1 included in the management system 100 is not limited to a specific number. The image processing device 1 will be described in detail below.

The access point 3 forms a local network. The access point 3 connects a terminal (here, the image processing device 1) in the local network to the network 4. That is, the access point 3 relays data between the image processing device 1 and the server 2.

Further, the access point 3 relays data between the image processing devices 1. That is, the access point 3 transmits the data from one of the image processing devices 1 to another one of the image processing devices 1. The access point 3 connects to the image processing devices 1 wirelessly or by wire.

The network 4 is a communication network for transmitting and receiving data. Here, the network 4 relays data between the server 2 and the access point 3. For example, the network 4 may be the Internet. Further, the network 4 may be a unique communication network.

The server 2 manages each of the image processing devices 1. Here, the server 2 sets the image processing device 1 according to an operation by an operator or the like. For example, the server 2 sets various parameters and the like in the image processing device 1. The server 2 sets the image processing device 1 by transmitting the setting information indicating the setting content of the image processing device 1 to the image processing device 1. The server 2 will be described in detail below.

Next, the image processing device 1 will be described. Since the image processing devices 1a, 1b, 1c, and the like have the same configuration, the image processing devices 1a, 1b, 1c, and the like will be described as the image processing device 1.

Figure 2:
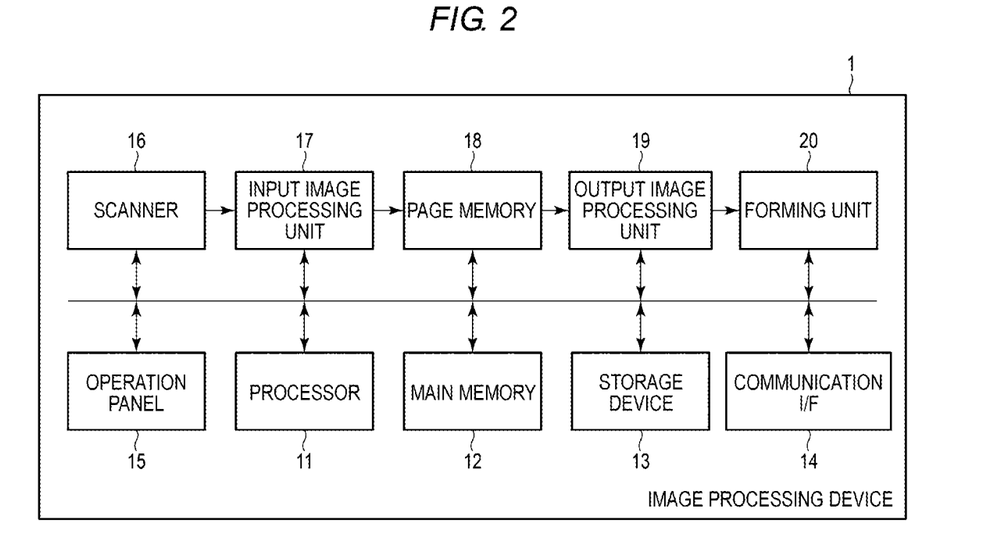
FIG. 2 is a block diagram illustrating a configuration example of an image processing device.

FIG. 2 is a block diagram illustrating a configuration example of the image processing device 1 according to the embodiment. As illustrated in FIG. 2, the image processing device 1 includes a processor 11, a main memory 12, a storage device 13 (memory), a communication interface 14, an operation panel 15, a scanner 16, an input image processing unit 17, a page memory 18, an output image processing unit 19, a forming unit 20 (a printer), and the like. Each of these parts is connected to each other via a data bus or the like.

The image processing device 1 may have a configuration as required in addition to the configuration illustrated in FIG. 2, or a specific configuration may be excluded from the image processing device 1.

The processor 11 has a function of controlling an operation of the entire image processing device 1. The processor 11 may include an internal memory, various interfaces, and the like. The processor 11 realizes various processes by executing a program stored in advance by the internal memory, the storage device 13, or the like.

It should be noted that some of the various functions realized by the processor 11 executing the program may be realized by a hardware circuit. In this case, the processor 11 controls the function executed by the hardware circuit.

The main memory 12 is a volatile memory. The main memory 12 is a working memory or a buffer memory. The main memory 12 stores various application programs based on instructions from the processor 11. Further, the main memory 12 may store data necessary for executing the application program, an execution result of the application program, and the like.

The storage device 13 is a non-volatile memory capable of writing and rewriting data. The storage device 13 is composed of, for example, a Hard Disk Drive (HDD), a Solid State Drive (SSD), a flash memory, or the like. The storage device 13 stores a control program, an application, various data, and the like according to the operational use of the image processing device 1.

In addition, the storage device 13 stores model information indicating the model of the image processing device 1. Here, the model information indicates a numerical value as an ID for identifying the model. Further, the storage device 13 stores an applied list and an unapplied list. The applied list and the unapplied list will be described below.

The communication interface 14 is an interface for transmitting and receiving data to and from the access point 3. That is, the communication interface 14 transmits and receives data to and from the server 2 or another image processing device 1 via the access point 3. For example, communication interface 14 supports wired or wireless Local Area Network (LAN) connections.

Various instructions are input to the operation panel 15 by an operator of the image processing device 1. The operation panel 15 transmits a signal indicating the instruction input by the operator to the processor 11. The operation panel 15 includes, for example, a keyboard, a numeric keypad, a touch panel, and the like as an operation unit.

Further, the operation panel 15 displays various information to the operator of the image processing device 1. That is, the operation panel 15 displays a screen showing various information based on the signal from the processor 11. The operation panel 15 includes, for example, a liquid crystal display as a display unit.

The scanner 16 optically scans a document and reads an image of the document as image data. The scanner 16 reads the document as a color image. The scanner 16 is composed of a sensor array formed in a main scanning direction and the like. The scanner 16 moves the sensor array in a sub-scanning direction and scans the entire document.

The input image processing unit 17 processes the image data read by the scanner 16. The input image processing unit 17 may process image data from other than the scanner 16. For example, the input image processing unit 17 may process image data sent from a USB memory, a PC, a smartphone, or the like.

The page memory 18 stores the image data processed by the input image processing unit 17. The output image processing unit 19 processes the image data stored in the page memory 18 so that the forming unit 20 can print the image data on a paper sheet.

The forming unit 20 prints the image data processed by the output image processing unit 19 on a paper sheet under the control of the processor 11. The forming unit 20 prints the image data on a paper sheet by an electrophotographic method. The forming unit 20 is composed of a transfer body, a photoconductor drum which transfers a toner image to a transfer body, a transfer roller which transfers a toner image from the transfer body to a paper sheet, a heater which heats the paper sheet on which the toner image is transferred, and the like. The forming unit 20 may print image data on a paper sheet by an inkjet method. The configuration of the forming unit 20 is not limited to a specific configuration.

Figure 3:
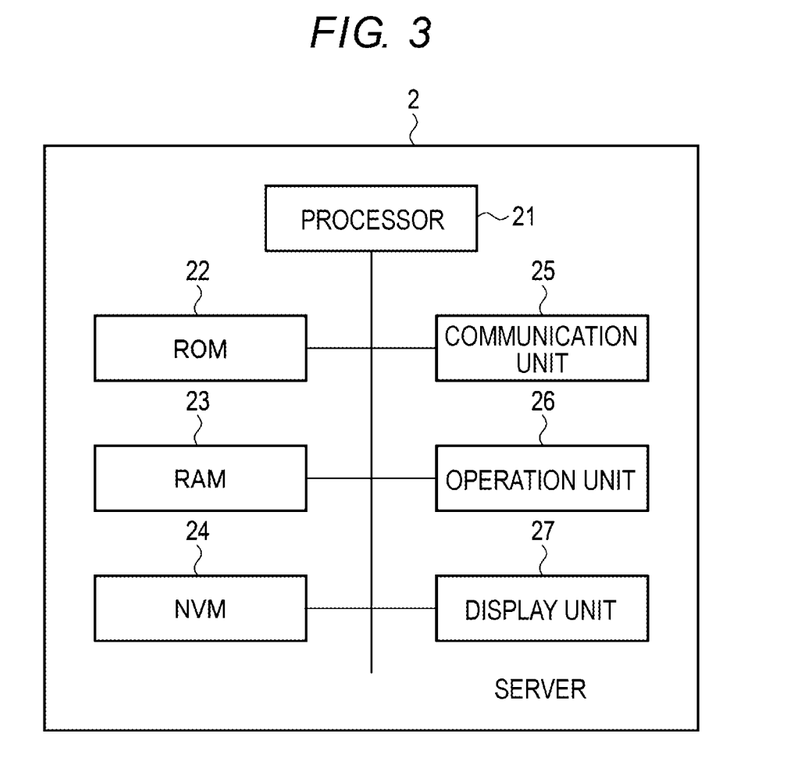
FIG. 3 is a block diagram illustrating a configuration example of a server.

Next, the server 2 will be described. FIG. 3 illustrates a configuration example of the server 2 according to the embodiment. FIG. 3 is a block diagram illustrating a configuration example of the server 2. As illustrated in FIG. 3, the server 2 includes a processor 21, a read-only memory (ROM) 22, a random access memory (RAM) 23, a non-volatile memory (NVM) 24, a communication unit 25, an operation unit 26, a display unit 27, and the like.

The processor 21, the ROM 22, the RAM 23, the NVM 24, the communication unit 25, the operation unit 26, and the display unit 27 are connected to each other via a data bus or the like. In addition to the configuration illustrated in FIG. 3, the server 2 may have a configuration as required, or a specific configuration may be excluded from the server 2.

The processor 21 has a function of controlling the operation of the entire server 2. The processor 21 may include an internal cache, various interfaces, and the like. The processor 21 realizes various processes by executing a program stored in advance in the internal memory, the ROM 22, or the NVM 24.

Some of the various functions realized by the processor 21 executing the program may be realized by a hardware circuit. In this case, the processor 21 controls the functions performed by the hardware circuits.

The ROM 22 is a non-volatile memory in which a control program, control data, and the like are stored in advance. The control program and control data stored in the ROM 22 are preliminarily incorporated according to specifications of the server 2.

The RAM 23 is a volatile memory. The RAM 23 temporarily stores data and the like being processed by the processor 21. The RAM 23 stores various application programs based on instructions from the processor 21. Further, the RAM 23 may store data necessary for executing the application program, an execution result of the application program, and the like.

The NVM 24 is a non-volatile memory capable of writing and rewriting data. The NVM 24 is composed of, for example, an HDD, an SSD, a flash memory, or the like. The NVM 24 stores a control program, an application, various data, and the like according to the operational use of the server 2.

The communication unit 25 is an interface for connecting to the network 4. That is, the communication unit 25 transmits and receives data to and from the image processing device 1 and the like via the network 4 and the access point 3. For example, the communication unit 25 is an interface which supports a wired or wireless LAN connection.

The operation unit 26 receives inputs for various operations from an operator. The operation unit 26 transmits a signal indicating the input operation to the processor 21. The operation unit 26 may be composed of a touch panel.

The display unit 27 displays the image data from the processor 21. For example, the display unit 27 is composed of a liquid crystal monitor. If the operation unit 26 is composed of a touch panel, the display unit 27 may be integrally formed with the operation unit 26.

Next, functions realized by the server 2 will be described. The function realized by the server 2 is realized by the processor 21 executing a program stored in the internal memory, the ROM 22, the NVM 24, or the like.

First, the processor 21 has a function of transmitting setting information indicating the setting content to the image processing device 1.

For example, the processor 21 generates setting information corresponding to each image processing device 1 according to an operation from the operator. The setting information includes the setting content of the image processing device 1 and an ID for identifying the setting content.

Here, the setting information indicates a value such as a parameter set in the image processing device 1 as a setting content. In addition, the setting information is generated as an extensible markup language (XML) file.

Figure 4:
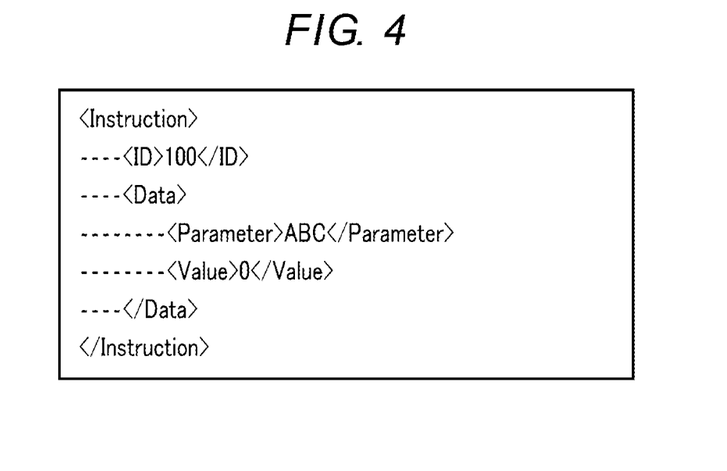
FIG. 4 is a diagram illustrating a configuration example of setting information.

FIG. 4 illustrates a configuration example of setting information. As illustrated in FIG. 4, the setting information is composed of an ID tag and a Data tag.

The setting information stores an ID which identifies the setting content between a start tag and an end tag of the ID. Here, the ID is a numerical value. The ID may be a character string, a symbol, a numerical value, or a combination thereof.

In addition, the setting information stores the setting content between a start tag and an end tag of Data. Here, the setting information stores a value between a start tag and an end tag of each element (parameter, value, and the like) as the setting content. The configuration of the setting information is not limited to a specific configuration.

If the setting information is generated, the processor 21 stores the generated setting information in the NVM 24. The processor 21 may update the setting information as appropriate according to an operation from an operator or the like.

The processor 21 waits until the processor 21 receives a request for setting information from the image processing device 1 through the communication unit 25.

If the request is received from the image processing device 1, the processor 21 acquires the setting information corresponding to the image processing device 1 from the NVM 24. If the setting information is acquired, the processor 21 transmits a response including the acquired setting information to the image processing device 1 through the communication unit 25.

Further, the processor 21 has a function of indicating that the setting content is not set in the image processing device 1. As will be described below, the image processing device 1 transmits a notification to the server 2 indicating that the settings are not set to itself.

The processor 21 receives the notification from the image processing device 1 through the communication unit 25. Upon receiving the notification, the processor 21 indicates to the operator that the setting content indicated by the notification is not set in the image processing device 1. For example, the processor 21 displays a message indicating that the setting content indicated by the notification is not set in the image processing device 1 on the display unit 27. For example, the processor 21 displays an ID for identifying the setting content, an ID for identifying the image processing device 1, and the like on the display unit 27.

Next, the functions realized by the image processing device 1 will be described. The function realized by the image processing device 1 is realized by the processor 11 executing a program stored in the internal memory or the storage device 13.

First, the processor 11 has a function of applying the setting content to itself according to the setting information.

The processor 11 transmits a request for setting information to the server 2 at a predetermined timing through the communication interface 14. For example, processor 11 transmits the request to the server 2 at predetermined intervals (for example, every 24 hours). Further, the processor 11 transmits the request to the server 2 at a timing different from the timing at which the other image processing device 1 transmits the request.

When transmitting a request for setting information, the processor 11 waits until the processor 11 receives a response including setting information from the server 2 through the communication interface 14.

Upon receiving the response including the setting information through the communication interface 14, the processor 11 extracts the setting content from the setting information. If the setting content is extracted, the processor 11 applies the extracted setting content to itself. For example, the processor 11 stores values such as parameters included in the setting content in a predetermined area.

Further, the processor 11 has a function of transmitting ID information including an ID for identifying the setting content applied to itself and its own model information to another image processing device 1.

If the setting content is applied to itself, the processor 11 extracts an ID which identifies the setting content from the setting information. After extracting the ID, the processor 11 acquires model information from the storage device 13.

If the model information is acquired, the processor 11 generates ID information including the extracted ID and the acquired model information. For example, the processor 11 generates ID information according to an Object Identifier (OID).

Figure 5:
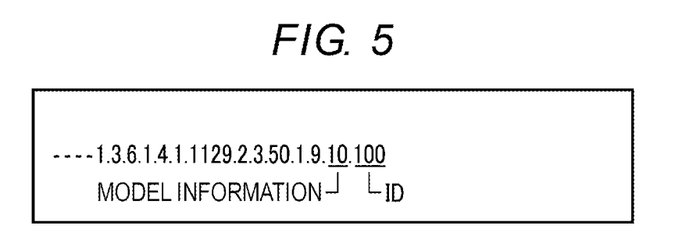
FIG. 5 is a diagram illustrating a configuration example of ID information.

FIG. 5 illustrates a configuration example of the ID information. In the example illustrated in FIG. 5, the ID information includes model information and an ID for identifying the setting content at the end. Here, the ID information includes "10" as model information and "100" as ID.

If the ID information is generated, the processor 11 transmits the generated ID information to another image processing device 1 through the communication interface

14. That is, the processor 11 transmits the ID information to another image processing device 1 via the access point 3. For example, the processor 11 broadcasts get-request as ID information to a local network according to a Simple Network Management Protocol (SNMP).

In addition, the processor 11 has a function to update the applied list.

If the ID information is transmitted to another image processing device 1, the processor 11 adds the extracted ID to the applied list. Here, the processor 11 adds the date and time if the setting content is applied to the applied list in association with the extracted ID.

Figure 6:
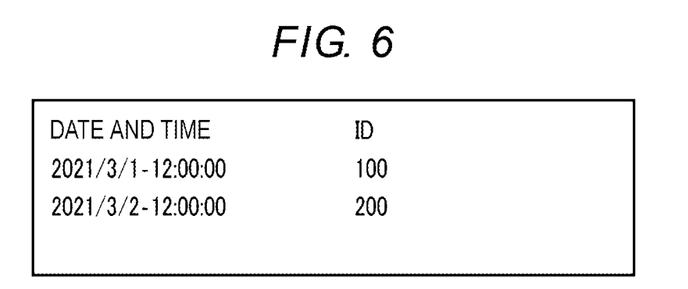
FIG. 6 is a diagram illustrating a configuration example of an applied list.

The applied list is a list indicating the ID which identifies the setting content applied to the image processing device 1. The applied list stores the date and time if the setting content is applied and the ID in association with each other.

FIG. 6 illustrates a configuration example of the applied list. As illustrated in FIG. 6, the applied list stores the "date and time" and the "ID" in association with each other.

"Date and time" indicates the date and time that the setting content is applied. "ID" indicates an ID which identifies the setting content.

Further, the processor 11 has a function of receiving ID information from another image processing device 1.

As described above, the processor 11 transmits ID information to another image processing device 1 through the communication interface 14. The other image processing device 1 also transmits ID information in the same manner.

Therefore, the processor 11 receives the ID information from the other image processing device 1 through the communication interface 14.

In addition, the processor 11 has a function of updating the unapplied list based on the ID information from another image processing device 1.

Figure 7:
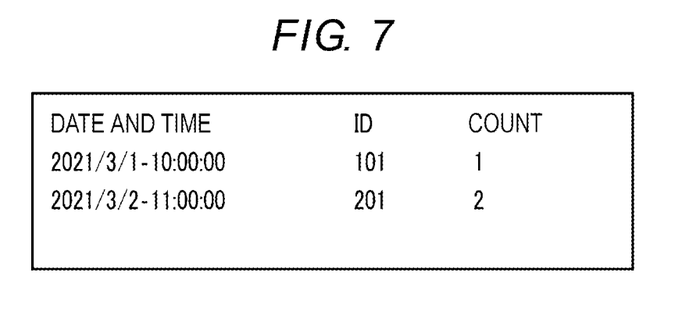
FIG. 7 is a diagram illustrating a configuration example of an unapplied list.

The unapplied list indicates the ID of the setting content applied to another image processing device 1 with the same model information as its own model information but not applied to itself. Further, the unapplied list indicates the number of other image processing devices 1 to which the setting contents are applied.

FIG. 7 illustrates a configuration example of the unapplied list. As illustrated in FIG. 7, the unapplied list stores the "date and time", the "ID", and the "count" in association with each other as one record.

"Date and time" indicates the date and time that the setting content is applied to the other image processing device 1. That is, the "date and time" is the date and time that the ID information including the ID which identifies the setting content is received from the other image processing device 1. If the ID information including the ID which identifies the setting content is received a plurality of times, the "date and time" indicates the date and time that the latest ID information is received.

"ID" indicates an ID which identifies the setting content.

"Count" indicates the number of times that ID information including the ID which identifies the setting content is received.

If the processor 11 receives the ID information from another image processing device 1, the processor 11 extracts the model information from the ID information. If the model information is extracted, the processor 11 determines whether the extracted model information matches the model information stored in the storage device 13. Here, the processor 11 determines whether the extracted model information and the model information stored in the storage device 13 match.

If it is determined that both model information match, the processor 11 extracts the ID from the ID information. If the ID is extracted, the processor 11 determines whether the extracted ID exists in the applied list. That is, the processor 11 determines whether the setting content corresponding to the extracted ID was already applied to itself.

If the extracted ID does not exist in the applied list, the processor 11 determines whether the extracted ID exists in the unapplied list.

If it is determined that the extracted ID does not exist in the unapplied list, the processor 11 adds the date and time that the ID information is received to the unapplied list in association with the extracted ID and "1" as a count.

If it is determined that the extracted ID exists in the unapplied list, the processor 11 updates the "date and time" corresponding to the extracted ID in the unapplied list to the date and time that the ID information is received. In addition, the processor 11 counts up the "count" corresponding to the extracted ID in the unapplied list.

If it is determined that the two pieces of model information do not match, or if it is determined that the extracted ID exists in the applied list, the processor 11 ends the operation related to the received ID information.

Further, the processor 11 has a function of transmitting a notification indicating that the setting content is not applied to the server 2 based on the unapplied list.

The processor 11 waits until the processor 11 receives the setting information from the server 2. That is, the processor 11 waits until the timing of transmitting the request to the server 2.

Upon receiving the response including the setting information from the server 2, the processor 11 extracts the ID from the setting information. If the ID is extracted, the processor 11 deletes the record including the extracted ID from the unapplied list.

Next, the processor 11 deletes records with the old "date and time" from the unapplied list. For example, when a predetermined period (for example, 24 hours) or more is passed from the "date and time", the processor 11 deletes the record including the "date and time" from the unapplied list.

If the record including the extracted ID is deleted from the unapplied list, the processor 11 determines whether there is a record in the unapplied list whose "count" is equal to or higher than a predetermined threshold value (here, 2).

If it is determined that there is a record whose "count" is equal to or greater than a predetermined threshold value (here, 2), the processor 11 extracts the "ID" corresponding to the "count" of 2 or more from the unapplied list. If the "ID" is extracted, the processor 11 transmits a notification indicating that the setting content corresponding to the extracted "ID" is not applied to itself to the server 2 through the communication interface 14. For example, the notification may include the extracted "ID".

Next, an operation example of the image processing device 1 will be described. First, an operation example in which the image processing device 1 applies the setting content will be described.

Figure 8:
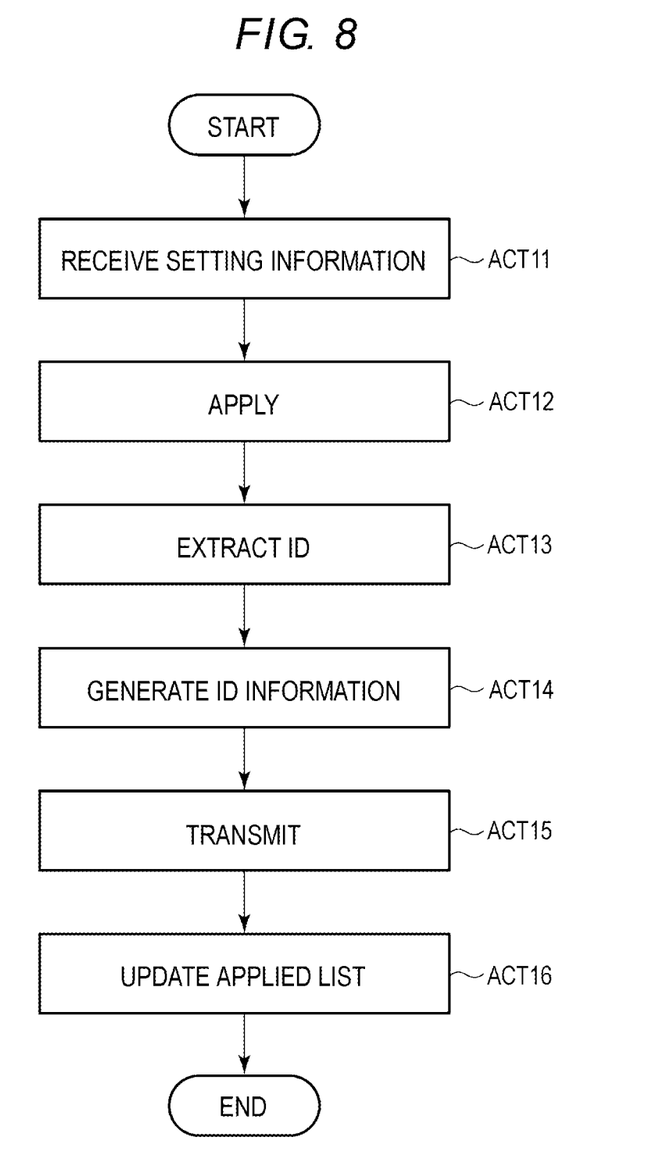
FIG. 8 is a flowchart illustrating an operation example of the image processing device.

FIG. 8 is a flowchart for illustrating an operation example in which the image processing device 1 applies the setting content.

First, the processor 11 receives the setting information from the server 2 through the communication interface 14 (Act 11). If the setting information is received from the server 2, the processor 11 applies the setting content to itself according to the setting information (Act 12).

If the setting content is applied to itself, the processor 11 extracts an ID (a first ID) for identifying the setting content (first setting content) from the setting information (Act 13). If the ID is extracted, the processor 11 generates ID information (first ID information) including the extracted ID and the model information (first model information) stored in the storage device 13 (Act 14).

If the ID information is generated, the processor 11 transmits the generated ID information to another image processing device 1 through the communication interface 14 (Act 15). If the generated ID information is transmitted to another image processing device 1, the processor 11 stores the date and time that the setting content is applied and the extracted ID in the applied list in association with each other (Act 16).

If the date and time if the setting content is applied and the extracted ID are stored in the applied list in association with each other, the processor 11 ends the operation.

Figure 9:
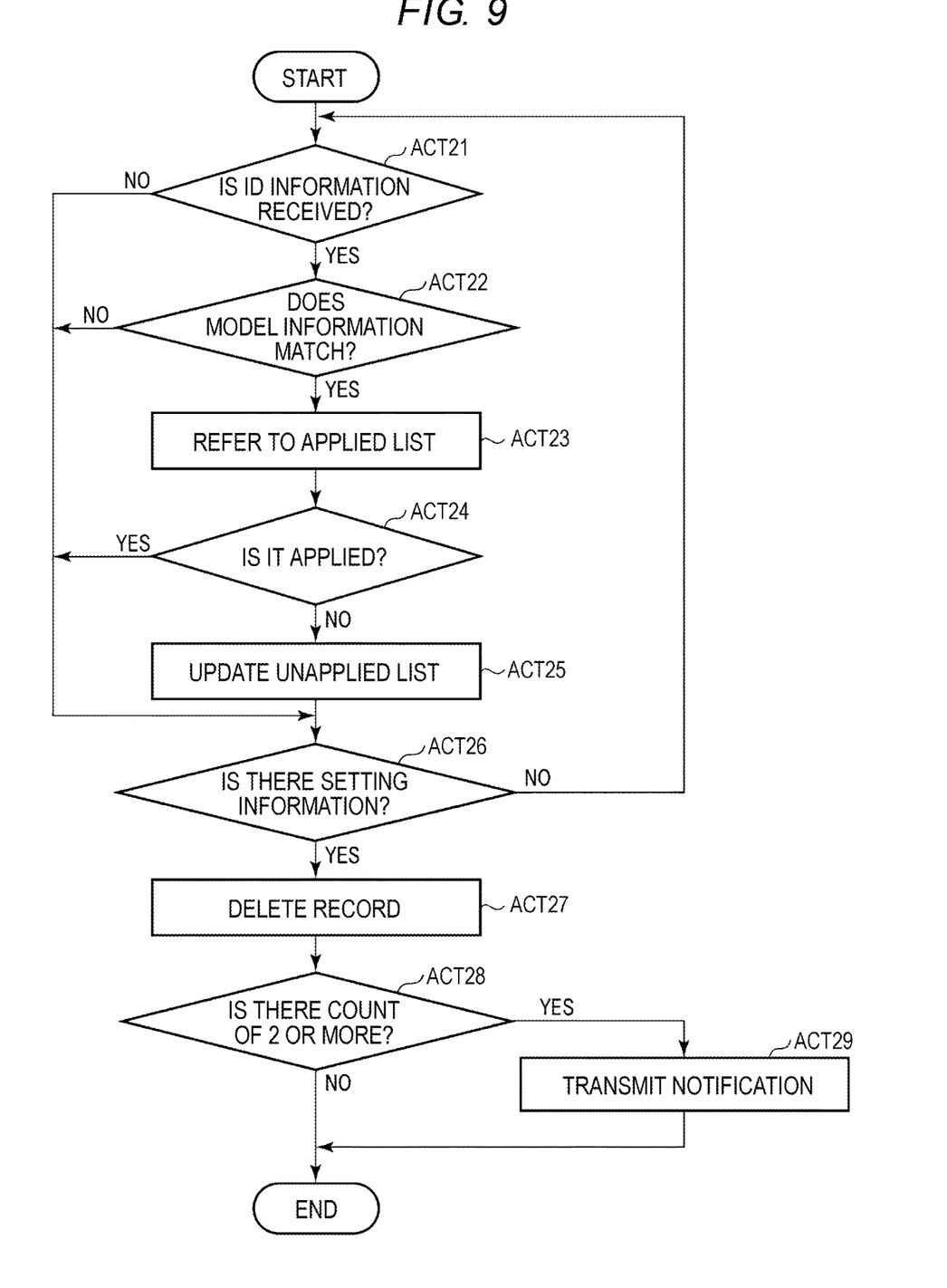
FIG. 9 is a flowchart illustrating an operation example of the image processing device.

Next, an operation example in which the image processing device 1 transmits a notification to the server 2 will be described. FIG. 9 is a flowchart for illustrating an operation example in which the image processing device 1 transmits a notification to the server 2.

First, the processor 11 determines whether the ID information (second ID information) is received from another image processing device 1 through the communication interface 14 (Act 21). If it is determined that the ID information is received from another image processing device 1 (Act 21, YES), the processor 11 determines whether the model information (second model information) included in the ID information and the model information stored in the storage device 13 match (Act 22).

If it is determined that the model information included in the ID information and the model information stored in the storage device 13 match (Act 22, YES), the processor 11 refers to the applied list and determines whether the setting content (second setting content) corresponding to the ID (a second ID) included in the ID information is applied to itself (Act 23).

If it is determined that the setting content corresponding to the ID included in the ID information is not applied to itself (Act 24, NO), the processor 11 updates the unapplied list (Act 25). That is, the processor 11 adds the ID or counts up the "count" corresponding to the ID in the unapplied list (Act 25).

If it is determined that the ID information is not received (Act 21, NO), if it is determined that the model information included in the ID information and the model information stored in the storage device 13 do not match (Act 22, NO), if it is determined that the setting content is applied to itself (Act 24, YES), or if the unapplied list is updated (Act 25), the processor 11 determines whether the setting information is received from the server 2 through the communication interface 14 (Act 26). That is, the processor 11 determines whether the current time is the timing for receiving the setting information.

If it is determined that the setting information is not received from the server 2 (Act 26, NO), the processor 11 returns to Act 21.

If it is determined that the setting information is received from the server 2 (Act 26, YES), the processor 11 deletes the record from the unapplied list (Act 27). That is, the processor 11 deletes the old record and the record corresponding to the ID included in the ID information from the unapplied list.

If the record is deleted, the processor 11 determines in the unapplied list whether there is a record whose counter is equal to or higher than a predetermined threshold value (here, "2") (Act 28). If it is determined that there is a record whose counter is equal to or higher than a predetermined threshold value (Act 28, YES), the processor 11 transmits a notification indicating that the setting content corresponding to the ID of the record is not applied to itself to the server 2 through the communication interface 14 (Act 29).

If the counter determines that there is no record whose value is equal to or higher than the predetermined threshold value (Act 28, NO), or if the notification is transmitted to the server 2 (Act 29), the processor 11 ends the operation.

The processor 11 does not have to execute Act 27 if there is no record to be deleted from the unapplied list.

Further, the processor 11 executes Act 21 to Act 29 and Act 11 to Act 16 in parallel. Here, Act 11, Act 26, and YES indicate the same operation.

Further, the processor 11 may transmit a notification indicating that the setting content corresponding to the ID of the unapplied list is not applied to itself regardless of the count value to the server 2.

Also, the processor 11 does not have to delete old records from the unapplied list.

Further, the device managed by the management system 100 does not have to be the image processing device 1 which processes an image. For example, the device managed by the management system 100 may be an information processing device which performs the operation described above.

In the flow of FIG. 9, the flow of deleting records from the unapplied list after YES in Act 26 is explained, but in parallel with this, the process of FIG. 8 is also executed by the processor 11.

If the image processing device configured as described above applies the setting content to itself, the image processing device transmits ID information including its own model information and an ID for identifying the setting content to another image processing device. Further, if the image processing device receives ID information including model information matching with its own model information from another image processing device, the image processing device determines whether the setting content corresponding to the ID included in the ID information is applied to itself. If the setting content is not applied to itself, the image processing device transmits a notification indicating that the setting content is not applied to itself to the server if the setting information is received. As a result, the image processing device can notify the server that the setting content applied to other image processing devices with the same model information is not applied to itself. Therefore, the image processing device can be encouraged to apply the appropriate setting content to itself.

While certain embodiments have been described, these embodiments have been presented by way of example only, and are not intended to limit the scope of the invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A processing device comprising:
   an interface configured to facilitate communication with a server and one or more other processing devices;
   a memory configured to store (i) first model information indicating a first model of the processing device and (ii) an unapplied list; and
   a processor configured to:

receive setting information from the server through the interface, the setting information including a first ID for identifying a first setting content, apply the first setting content, transmit first ID information including the first model information and the first ID to the one or more other processing devices through the interface, receive second ID information from the one or more other processing devices through the interface, acquire second model information from the second ID information;

determine whether a second setting content of a second ID included in the second ID information is already applied to the processing device in response to the second model information matching the first model information stored in the memory, store the second ID included in the second ID information in the unapplied list if it is determined that the second setting content is not applied to the processing device, and transmit a notification through the interface to the server indicating that the second setting content is not applied if the second setting content is not applied to the processing device.

2. The processing device of claim 1, wherein the processor is configured to delete a record of the unapplied list in response to receiving the setting information from the server.

3. The processing device of claim 2, wherein the processor is configured to transmit the notification indicating that the second setting content of the second ID indicated by the unapplied list from which the second ID is deleted is not applied to the processing device.

4. The processing device of claim 1, wherein the unapplied list stores the second ID included in the second ID information and a number of times that the second ID information has been received, and wherein the processor is configured to transmit the notification to the server indicating that the second setting content of the second ID is not applied if the number of times is equal to or greater than a predetermined threshold value.

5. The processing device of claim 4, wherein the predetermined threshold value is 2.

6. The processing device of claim 1, wherein the unapplied list stores a date and time that the second ID information is received, and wherein the processor is configured to delete the second ID corresponding to the date and time from the unapplied list if a predetermined period passes from the date and time.

7. The processing device of claim 1, wherein the setting information includes the first setting content.

8. The processing device of claim 1, wherein the processor is configured to transmit the first ID information via a local network to the one or more other processing devices.

9. The processing device of claim 8, wherein the processor is configured to transmit a get-request as the first ID information according to a Simple Network Management Protocol (SNMP).

10. The processing device of claim 1, wherein the processing device is an image processing device or an information processing device.

11. A processing device comprising:
an interface configured to facilitate communication with a server and a second processing device;
a memory configured to store (i) first model information indicating a first model of the processing device and (ii) an unapplied list; and
a processor configured to:
receive ID information from the second processing device through the interface,
acquire second model information from the ID information;
determine whether a setting content of an ID included in the ID information is already applied to the processing device in response to the second model information matching the first model information stored in the memory,
store the ID included in the ID information in the unapplied list if the setting content is not applied to the processing device, and
transmit a notification through the interface to the server indicating that the setting content is not applied to the processing device.

12. The processing device of claim 11, wherein the unapplied list stores the ID included in the ID information and a number of times that the ID information has been received, and wherein the processor is configured to transmit the notification to the server indicating that the setting content of the ID is not applied if the number of times is equal to or greater than a predetermined threshold value.

13. The processing device of claim 12, wherein the predetermined threshold value is 2.

14. The processing device of claim 11, wherein the unapplied list stores a date and time that the ID information is received, and wherein the processor is configured to delete the ID corresponding to the date and time from the unapplied list if a predetermined period passes from the date and time.

15. The processing device of claim 11, wherein the processor is configured to:
receive setting information from the server through the interface;
apply the setting information; and
delete a record of the unapplied list in response to applying the setting information.

16. The processing device of claim 15, wherein the processor is configured to transmit second ID information including the first model information and a second ID of the setting information to the second processing device following the application of the setting information thereto.

17. A method that is executed by a processor of an information processing device, the method comprising:
receiving setting information from a server, the setting information including a first ID for identifying a first setting content;
applying the first setting content;
transmitting first ID information including first model information stored in a memory and the first ID to a second information processing device;
receiving second ID information from the second information processing device;
acquiring second model information from the second ID information;
determining whether a second setting content of a second ID included in the second ID information is already applied to the information processing device in response to the second model information matching the first model information stored in the memory; and
transmitting a notification to the server indicating that the second setting content is not applied to the server if the second content is not applied to the information processing device.

18. The method of claim 17, wherein the memory is configured to store an unapplied list, further comprising storing the second ID included in the second ID information in the unapplied list if it is determined that the second setting content is not applied to the processing device.

19. The method of claim 18, further comprising deleting a record of the unapplied list in response to at least one of (i) receiving the setting information from the server or (ii) a predetermined period passing for the second ID being in the unapplied list.

\* \* \* \* \*